United States Patent
Palanisamy (10) Patent No.: US 7,904,480 B2
(45) Date of Patent: Mar. 8, 2011

(54) SYSTEM AND METHOD FOR SYNCHRONIZING SERVICE METADATA

(75) Inventor: Muthukumar S. Palanisamy, Sunnyvale, CA (US)

(73) Assignee: Oracle International Corporation, Redwood Shores, CA (US)

( * ) Notice: Subject to any disclaimer, the term of this patent is extended or adjusted under 35 U.S.C. 154(b) by 420 days.

(21) Appl. No.: 12/032,546

(22) Filed: Feb. 15, 2008

(65) Prior Publication Data
US 2009/0024561 A1    Jan. 22, 2009

Related U.S. Application Data

(60) Provisional application No. 60/950,308, filed on Jul. 17, 2007.

(51) Int. Cl.
*G06F 7/00* (2006.01)
(52) U.S. Cl. ........................................ 707/798
(58) Field of Classification Search .......... 707/104, 707/798, 707, 801
See application file for complete search history.

(56) References Cited

U.S. PATENT DOCUMENTS 7,188,114 B2    3/2007    Liu et al.
7,725,482 B2 *  5/2010    Smith et al. .............. 707/759
2002/0046294 A1 * 4/2002  Brodsky et al. ........... 709/246
2005/0055372 A1    3/2005  Springer, Jr. et al.
2008/0306970 A1 * 12/2008  Gilman .................... 707/10

FOREIGN PATENT DOCUMENTS

EP    01510918    3/2005
KR    10-2001-0083845    9/2001

OTHER PUBLICATIONS

International Search Report and Written Opinion for PCT/US2008/070199, dated Jan. 21, 2009, 7 pages.

* cited by examiner

*Primary Examiner* — Pierre M Vital
*Assistant Examiner* — Truong V Vo
(74) *Attorney, Agent, or Firm* — Fliesler Meyer LLP (57) ABSTRACT

A system and method for synchronizing service metadata into a format for canonical representation of service metadata and publishing the synchronized service metadata into a metadata repository. The method comprises: receiving service metadata from a service producer; normalizing the service metadata into the format for canonical representation of service metadata; and publishing normalized service metadata into a metadata repository that supports the format for canonical representation of service metadata. The system comprises: at least one connector for each service producer, wherein the connector permits a synchronization system to communicate bi-directionally with the service producer; one normalizer for each service producer, wherein the normalizer transforms the service metadata into a format for the canonical representation of service metadata; and at least one provider for each service producer, wherein the provider publishes the canonical representation of service metadata into a metadata repository.

12 Claims, 5 Drawing Sheets

SYSTEM AND METHOD FOR SYNCHRONIZING SERVICE METADATA

CLAIM OF PRIORITY

The present application claims the benefit of priority under 35 U.S.C. §119(e) to U.S. Provisional Patent Application No. 60/950,308 entitled "SYSTEM AND METHOD FOR SYNCHRONIZING SERVICE METADATA," filed on Jul. 17, 2007, which application is incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

This invention is related to Service-Oriented Architecture and synchronizing service metadata in a metadata repository with the software applications that use the service metadata.

BACKGROUND

Service-Oriented Architecture (SOA) is based on the deconstruction of yesterday's monolithic applications and information technology infrastructure into a matrix of discrete, standards-based, network-accessible services. The process of transformation requires the organization, identification, and repurposing of applications and business processes of the existing information technology infrastructure. The transformation to SOA begins with an analysis of the IT infrastructure to identify applications, business processes, and other software assets that become services, or otherwise support the SOA.

Metadata is data about data, or more specifically, information about the content of the data; service metadata is information about the services in an SOA. Service producers use service metadata to describe what service consumers need to know to interact with the service producers. Service metadata is stored in a metadata repository by service producers and then accessed by service consumers. A metadata repository provides visibility into the portfolio of assets, the traceability of the assets within that portfolio, the relationships and interdependencies that connect the assets to each other, the policies that govern use of the assets, and the projects that produce the assets and consume the assets.

Service Component Architecture (SCA) is a set of specifications which describe a model for building applications and systems using a Service-Oriented Architecture. SCA extends and complements prior approaches to implementing services. SCA builds on open standards such as Web services. SCA defines services and systems in terms of components, composites (which are groups of connected components), and wires that are used to connect components. SCA provides a format for canonical representation of service metadata.

SUMMARY OF THE INVENTION

A system and method for synchronizing service metadata into a format for canonical representation of service metadata and publishing the synchronized service metadata into a metadata repository. The method comprises: receiving service metadata from a service producer; normalizing the service metadata into the format for canonical representation of service metadata; and publishing normalized service metadata into a metadata repository that supports the format for canonical representation of service metadata. The system comprises: at least one connector for each service producer, wherein the connector permits a synchronization system to communicate bi-directionally with the service producer; one normalizer for each service producer, wherein the normalizer transforms the service metadata into a format for the canonical representation of service metadata; and at least one provider for each service producer, wherein the provider publishes the canonical representation of service metadata into a metadata repository.

DETAILED DESCRIPTION

Many existing software applications were created before the Service Component Architecture (SCA) standard was adopted. These service producers create service metadata in their own proprietary formats. What is needed is a system to synchronize service metadata from a proprietary format into a normalized format for canonical representation of service metadata for storage in a metadata repository.

Described herein is a system to synchronize metadata from a proprietary format into a format for canonical representation of service metadata for storage in a metadata repository. The system synchronizes the service metadata of software applications in a bi-directional way. Once the metadata is synchronized, it is available for consumption in a standard format. In one embodiment, the standard format is Service Component Architecture (SCA). The metadata is distributed in a heterogeneous environment. Examples of applications that may make use of the service metadata include: design time integrated development environments (IDE), non-IDEs with a design time, run time engines with a service to fetch metadata, and applications that use a database to store metadata. The types of metadata that are synchronized include: service dependencies, service interfaces, schemas, properties, relationships, bindings, policies, exposable implementation details, and orchestration definitions.

Terminology

An artifact is something produced by a service producer and used by a service consumer. For each software application's 'design' tool, artifacts are currently in the form of files on a file system; e.g., data service (.ds) files; XML Schema files; WSDL files. Some software applications provide a metadata API for the deployed system; e.g., metadata service.

Artifact metadata is useful information about an artifact. Examples: name, version, last modified timestamp, URL, properties, etc. Of interest is metadata specifically related to services.

Asset is a representation of an artifact or a part of an artifact in the Metadata repository. Assets are of a particular asset type. Assets can be related using relationships, which also are typed.

Artifact metadata is stored in target repositories. The artifacts themselves are assumed to be stored external to the target repository, possibly in a source configuration management (SCM) system.

The metadata repository has asset types defined to represent the artifacts of each of the supported software applications. These are pre-defined and installed directly into the metadata repository as part of the installation process or the start-up process. In one embodiment, service component architecture (SCA) is used for the canonical representation of metadata.

In one embodiment, the software applications store their artifacts in a software configuration management (SCM) system, or on the file system, and the metadata repository holds artifact metadata. Specifically, the metadata repository holds metadata related to the services produced by each software application.

Synchronization can satisfy other metadata repository import/export needs as well. Embodiments may include: use of a common model consistent with a metadata repository metadata model and with SCA; interface to an arbitrary UDDI Registry; interface to any ebXML Registry; remote API to an embodiment of the invention; treating a metadata service repository as an SCM (for software applications that do not have one and want to persist their files); interface to a service registry; and providing an SCA API throughout the module.

The synchronization system is located between the applications that use the service-related metadata and the metadata repository where the metadata is stored. The synchronization system includes: connectors, which connect service producers and service consumers to the synchronization system; normalizers, which transform the service metadata from a proprietary format into a normalized format for canonical representation of service metadata; and providers, which publish the normalized service metadata into the metadata repository and/or other back-end systems.

In one embodiment, the synchronization system is used by a metadata repository. A metadata repository provides the tools to manage the metadata for any type of software asset, from business processes and Web services to patterns, frameworks, applications, and components. The relationships and interdependencies that connect those software assets are mapped to improve impact analysis, promote and optimize reuse, and measure the bottom line value. A metadata repository provides visibility into and traceability of the entire enterprise software asset portfolio. The goal is to let organizations govern the software asset lifecycle to ensure alignment with architecture. In one embodiment, the metadata repository provides information about services, design-time and/or run-time. In one embodiment, the metadata repository can provide location information pointing to design-time artifacts that exist outside the metadata repository (e.g. design-time artifacts stored in a source code management system). In one embodiment, the metadata repository provides location information pointing to a runtime instance of the service.

Figure 1:
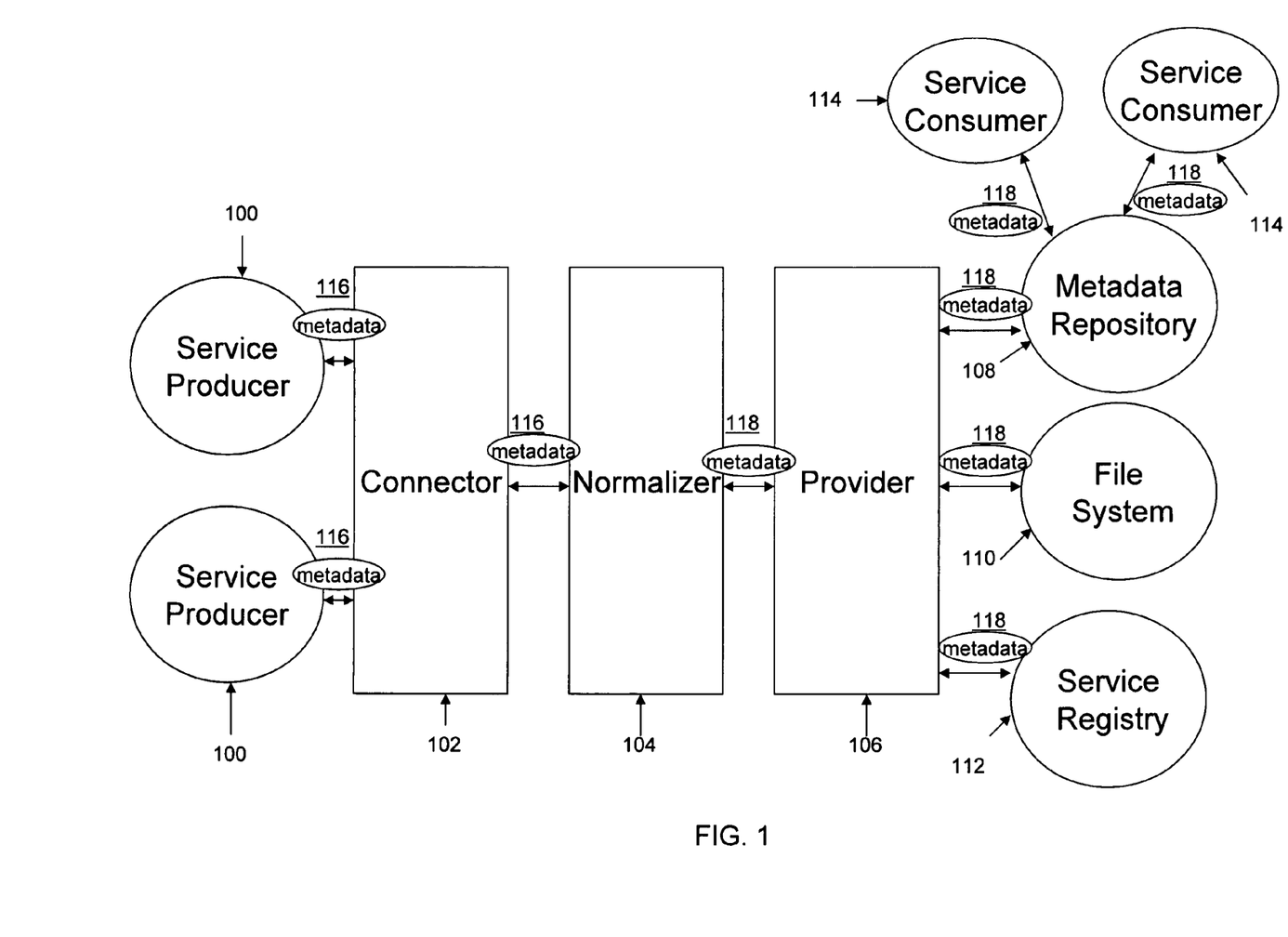
FIG. 1 shows the system architecture for one embodiment.

FIG. 1 shows the system architecture for one embodiment. Service producer 100 creates service metadata 116 in a proprietary format. The service metadata 116 is sent from the service producer 100 to the specific connector 102 for that type of software application. The connector sends the service metadata to the normalizer 104, which transforms the service metadata 116 into a normalized format for canonical representation of service metadata. The normalizer 104 then passes the normalized service metadata 118 to the provider 106 which publishes the normalized service metadata 118 to a metadata repository 108. In one embodiment, the provider 108 publishes the normalized service metadata 118 to the file system 110. In one embodiment, the provider 108 publishes the normalized service metadata 118 to a service registry 112.

Figure 2:
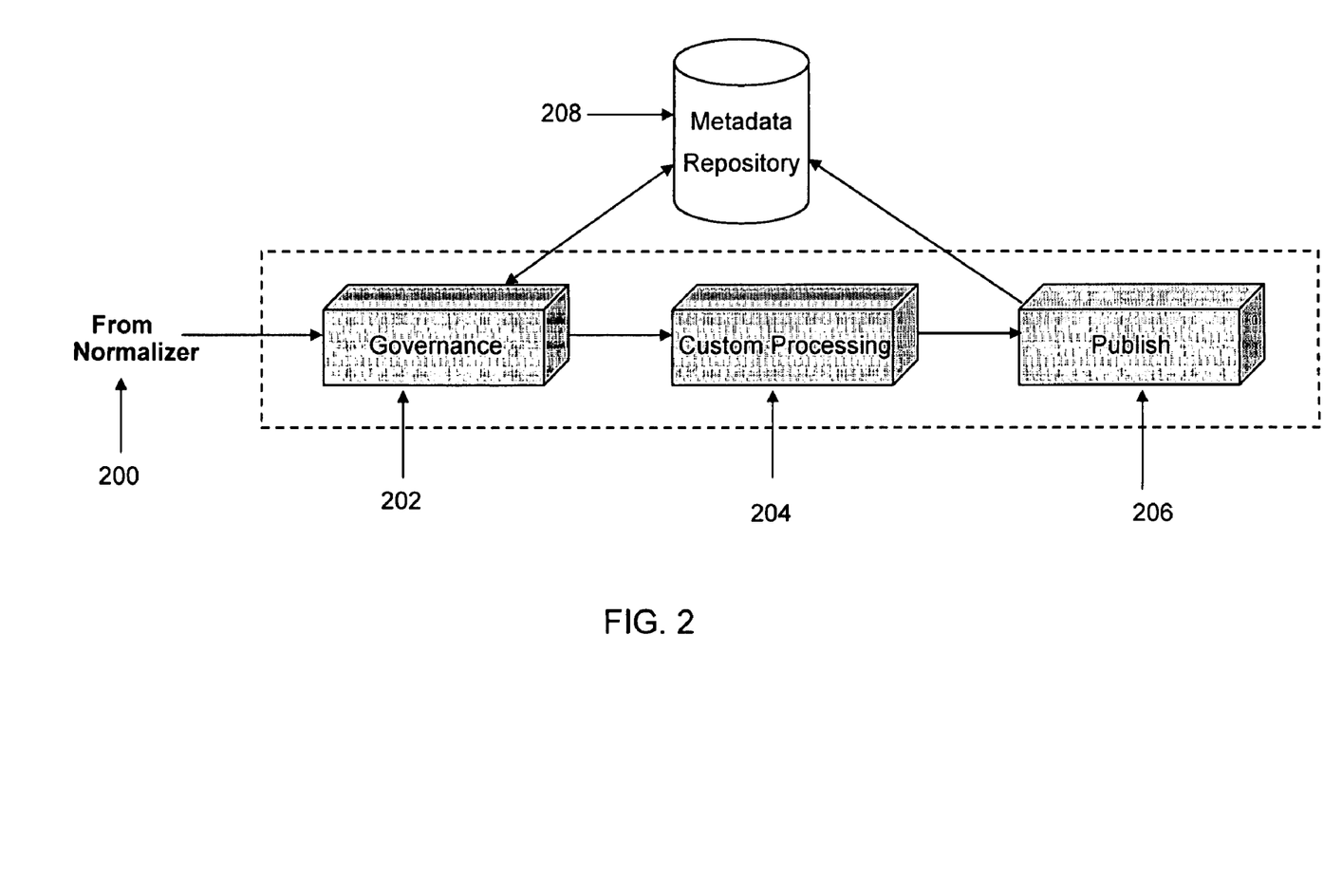
FIG. 2 shows the provider pipeline for one embodiment.

FIG. 2 shows a provider pipeline for one embodiment. Service metadata is passed from the normalizer 200 to a series of providers that process the service metadata sequentially. The first provider 202 applies governance rules to the service metadata, using the governance rules that are stored in the metadata repository 208. The second provider 204 applies custom processing to the service metadata. The third provider 206 publishes the service metadata to the metadata repository 208.

Figure 3:
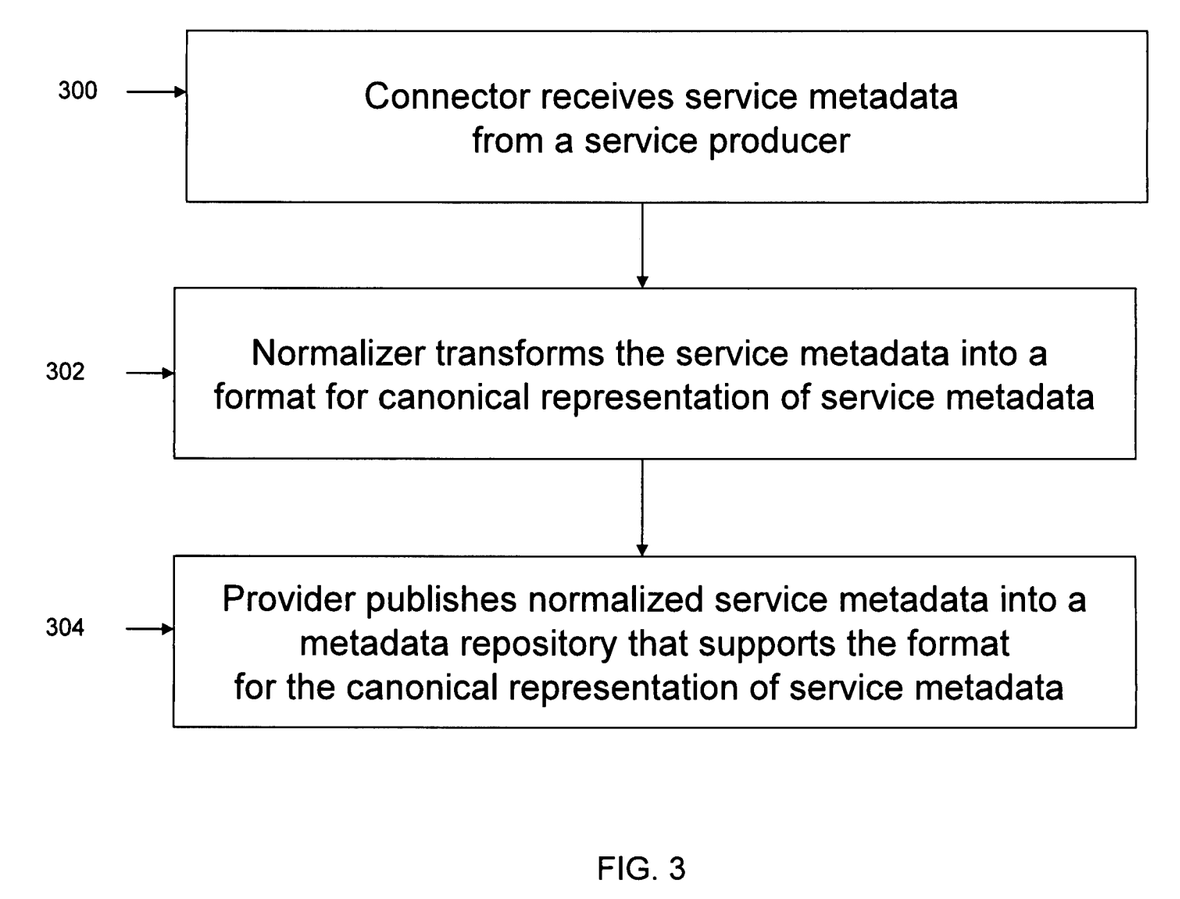
FIG. 3 shows a process for a method of synchronizing service metadata for one embodiment.

FIG. 3 shows a method for synchronizing service metadata for one embodiment. Service metadata is received from a software application 300. Then the service metadata is normalized into a format for canonical representation of service metadata 302. The service metadata is then stored in a metadata repository that supports the format for the canonical representation of service metadata 304.

In one specific embodiment, the provider is called a RepoProvider. Other embodiments may describe the provider differently.

Figure 4:
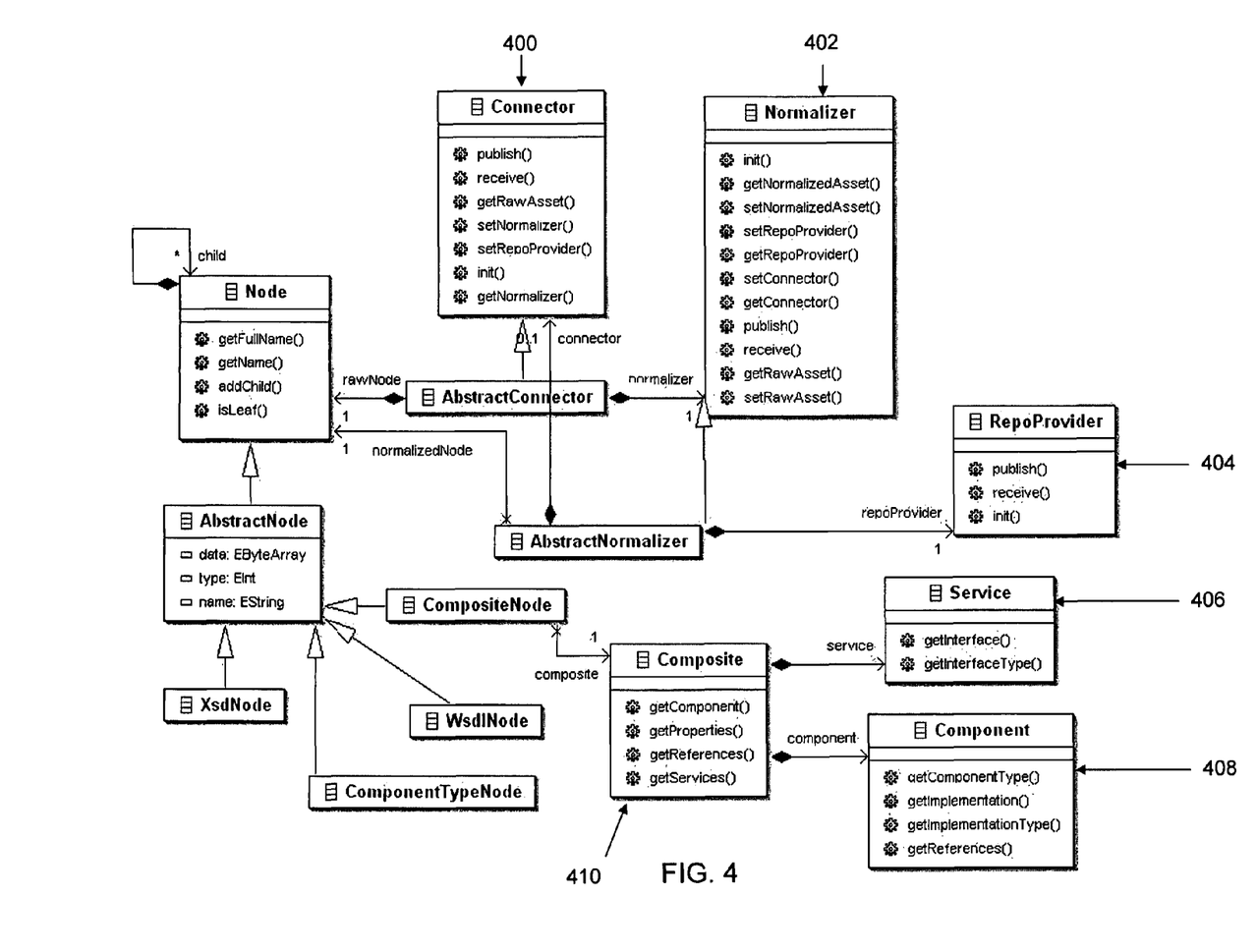
FIG. 4 shows a UML diagram describing the classes and interfaces for one embodiment.

FIG. 4 shows a UML diagram describing the classes and interfaces for one embodiment of the system. The Connector 400 connects the software application (whether a service producer or consumer) to the synchronization system. The Normalizer 402 transforms the service metadata from a proprietary format into a canonical representation of service metadata. The RepoProvider 404 publishes the normalized service metadata. The Service 406 is described by the service metadata. One or more components 408 are part of a composite 410 that uses one or more services 406.

Figure 5:
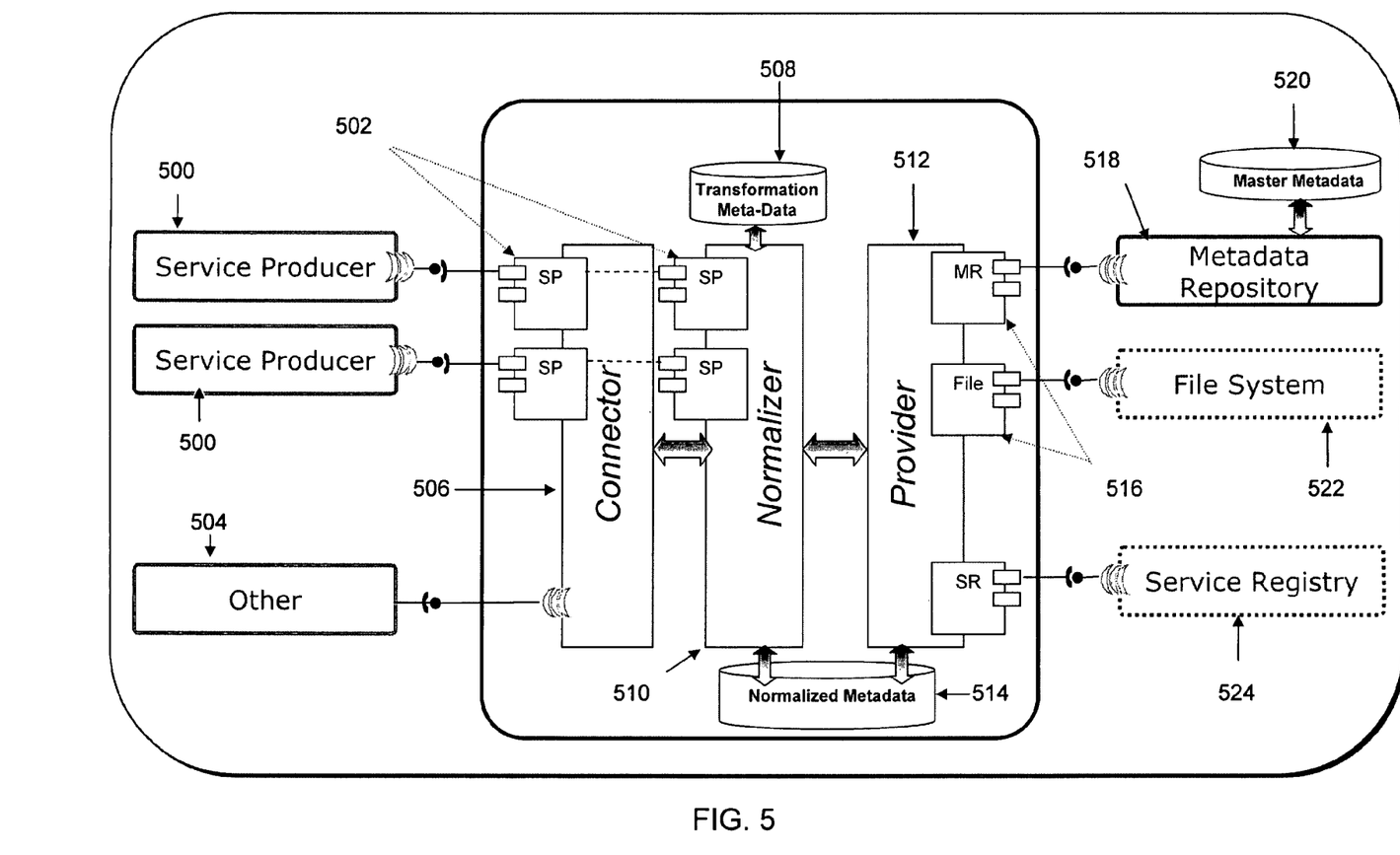
FIG. 5 shows the system architecture for one embodiment.

FIG. 5 shows the system architecture for one embodiment. Service producer 500 creates service metadata in a proprietary format. The service metadata is sent from the service producer 500 to the connector 506 for that type of service producer, through a service produce plug-in 502. The connector sends the service metadata to the normalizer 510, which transforms the service metadata into a normalized format for canonical representation of service metadata 514 using transformation metadata 508. The normalizer 510 then passes the normalized service metadata 514 to the provider 512 which publishes the normalized service metadata 514 to a metadata repository 518 through the metadata repository plug-ins 516. In one embodiment, the metadata repository 518 stores the metadata in a master metadata database 520. In one embodiment, the provider 512 publishes the service metadata to the file system 522. In one embodiment, the provider 512 publishes the service metadata to a service registry 524.

Each type of software application has a different connector, depending on the type of software application. The connector initiates the synchronization process. The connector fetches service metadata and populates a node object in native form. The connector maintains a link to the normalizer.

Each type of software application has a different normalizer, depending on the type of software application. The normalizer creates SCA artifacts from service producer-specific artifacts, and vice versa. The normalizer provides an API that takes the Node object from the connector, converts it to an SCA format, and makes the SCA objects available in the local process. The normalizer provides an API which can be fed with SCA artifacts from an application that can directly produce SCA artifacts. This enables any application that can natively speak SCA to interoperate with a metadata repository or any back-end system that supports SCA (such as a file system or service registry). The normalizer maintains a link to a provider that takes the SCA artifacts from the memory or the file system, converts to the target format, and publishes it and vice versa. For example, UDDIPublisher publishes the services to UDDI.

In an embodiment, there is one provider for each back-end system, including the metadata repository, the service registry, the file system, etc. The provider uses a back-end specific API to publish/inquire; for example, UDDI API. If the back-end doesn't support a "service," the system comes with a remotable provider interface to allow the back-end to periodically synchronize the metadata using a batch process.

In some embodiments, a provider pipeline permits the back-end repository to support SOA Governance where publishing and receiving metadata needs user authorization. In order to support a plug-and-play architecture, a provider pipeline is used, which is a chain of providers that is processed sequentially. When a provider in the chain throws an exception or fails, the processing stops. Governance processing can be wrapped in a provider and if the SOA Governance allows publishing, another provider can do the publishing.

In one embodiment, the service metadata is stored in a metadata repository. A metadata repository provides the tools to manage the metadata for any type of software asset, from business processes and Web services to patterns, frameworks, applications, and components. A metadata repository maps the relationships and interdependencies that connect those software assets to improve impact analysis, promote and optimize reuse, and measure the bottom line value. A metadata repository provides visibility into and traceability of the entire enterprise software asset portfolio. A metadata repository is designed to let organizations govern the software asset lifecycle to ensure alignment with architecture.

The following are example types of metadata that are synchronized:

The dependency information of the services is synchronized. A service may consume one or more other services. Since the service dependencies and service interfaces are not stored in a standard format across software applications, the system first normalizes the service information and makes it available for consumption. In one embodiment, the system normalizes the service dependencies and service interfaces into the SCA format.

Synchronization occurs in a bottom-up approach or a top-down approach. For the "Bottom-up" approach where the Services are already created, the system synchronizes the service information of various software applications and shows a dependency graph along with the Interfaces/Signatures, Properties etc. For the "Top-down" approach, information entered by an architect is used as a template and the system creates artifacts in the native format. For example, this is used to create a template DataService (*.ds) file which is used as a starting point by software developers.

The metadata repository acts as a system of record and maintains the metadata across the enterprise. After service metadata is normalized to the standard SCA model, the normalized service metadata is then published to the metadata repository. The repository only needs to understand the SCA model. The provider can also publish service metadata information to a service registry.

Software applications operate in a heterogeneous environment where the access to service information and metadata is accomplished using a variety of methods or protocols. Some software applications expose API to directly access the metadata from the local File system and some software applications require the use of a remote API like JMX to access this information.

A connector provides bi-directional connectivity to each application's metadata by encapsulating the logic to connect to each of the target system. Each application can have one or more connectors that fetch the metadata and make it available to the normalizer.

For example, a software application can have one connector to synchronize the metadata directly from a design time IDE that supports an offline mode where it is not connected to a running engine, and another connector to synchronize the metadata from a running engine using the remote Catalog Services API exposed by the software application.

The goal of the normalizer is to normalize the proprietary Service Information to the SCA format and make it available directly as "in-memory" Java objects. By decoupling the connector and normalizer, it is possible to create multiple connectors and normalizers for a given software application where metadata can be accessed in a variety of methods, thereby providing an architecture that is reusable. There is one normalizer for each type of service producer. The normalizer creates SCA artifacts from software application specific artifacts and vice-versa. The normalizer provides an API that takes the Node object from the Connector, converts to SCA format and makes the SCA objects available in the local process. The normalizer provides an API which can be fed with SCA artifacts from an application that can directly produce SCA artifacts. This enables software applications that can natively "speak" SCA to inter-operate with a metadata repository or any back-end. The normalizer maintains a link to a provider, one per target (for example Enterprise Service Repository), that takes the SCA artifacts from the memory or File System, converts to the target repo format, and publishes it and vice versa. For example, UDDIPublisher publishes the Services to UDDI.

The goal of the provider is to publish the Service Information and metadata to a back-end such as an Enterprise Service Repository or Service Registry. Since the Service Information is normalized to a standard model, the provider only has to deal with a standard model and use back-end specific API to publish the information. As more and more back-ends such as a partner Repository become available, additional provider plug-ins can be written to publish to that specific back-end.

Provider examples include a default file provider, a metadata repository provider, a service registry provider, a remote provider, and a system provider. A default file provider can write and read the SCA artifacts and other metadata to and from the file system. A metadata repository provider publishes and receives the metadata to and from metadata repository. A service registry provider publishes and receives the metadata to and from UDDI or ebXML compliant standard registries. Remote provider provides a Remote API that publishes the metadata to a remote drive by connecting to the remote service. Both client and server for the remote provider are provided as a web service. System provider assembles or aggregates composite files from multiple systems. For example, if one service consumes another service using a standard web service, system provider can scan the composite files for these two services and do a wiring from the component of the first service to the second service.

One embodiment is a software component for 'synchronizing' service-related metadata from software applications with a metadata repository that supports Service Component Architecture (SCA) as a canonical representation of service metadata, as that is a direction the industry is moving in for representing systems composed of services. The component is usable in multiple runtime environments (UI's, embedded in other applications, stand-alone, etc). It is designed to be modular, with plug-ins for application-specific interfaces.

A metadata repository stores metadata related to services. This metadata is in two forms: 1) design-time metadata: services and how they are related; and 2) deployment metadata: configuration and deployment information.

Following is a detailed (though not necessarily comprehensive) list of metadata that is stored in a metadata repository:

Service Interfaces—design-time and deployment;
Service Dependencies—a Service may consume one or more other Services;
Schemas—design-time;
Properties—design-time (definitions) and deployment (settings);
Relationships between Services—design-time;
Service Bindings—deployment;
Policies; and
Exposable Implementation details—deployment.

This service metadata is defined by service producers, and is subsequently searched for and reused in some fashion by service consumers. The metadata repository manages and provides access to information about services, either design-time or runtime. It may provide location information (e.g. URLs) pointing to design-time artifacts that exist outside the metadata repository (e.g. in a source code management (SCM) system). It may also provide location information pointing to a runtime instance of the service. However, these location references may not be resolvable within the consuming services.

Use Cases for Synchronizing Service Metadata

Sharing Assets. Share information about design-time or runtime (deployed) services artifacts to the metadata repository.
  a. New artifacts. Send a set of related artifacts to the metadata repository.
  b. Existing artifacts. Send a set of related artifacts to the metadata repository, updating the service-related metadata associated with those artifacts.
  c. Delete artifacts. Remove an artifact and all its dependencies from the repository so that it can no longer be used/shared.

Using Assets. Use design-time or runtime (deployed) services information stored in metadata repository.
  a. Retrieve artifacts. Retrieve one or more artifacts given known unique IDs, and optionally retrieving all dependent artifacts related to the initial set.
  b. Browse/retrieve. Starting from some context, browse (navigate through) the repository, following defined relationships between assets, view metadata for artifacts, download one or more artifacts and optionally, all dependent artifacts.
  c. Query/retrieve. Query the repository, view metadata for artifacts, download one or more artifacts and optionally, all dependent artifacts.

Write service producer metadata to the metadata repository.

View and access metadata repository artifact metadata from design tools.

Search the metadata repository for artifact metadata from design tools.

Retrieve a specific artifact stored as an Asset or Asset file in the metadata repository.

Updating an Asset results in a new version of the Asset within the metadata repository. The new version does not overwrite or delete the old version.

Expose metadata information in SCA form for interoperability purposes.

WSDL is the standard means of specifying and exchanging service information (both design-time and deployment information). The metadata repository stores WSDL when it introspects it. Some software applications use and/or produce WSDL.

One embodiment may be implemented using a conventional general purpose computer or a specialized digital computer or microprocessor(s) programmed according to the teachings of the present disclosure, as will be apparent to those skilled in the computer art. Appropriate software coding can readily be prepared by skilled programmers based on the teachings of the present disclosure, as will be apparent to those skilled in the software art. The invention may also be implemented by the preparation of integrated circuits or by interconnecting an appropriate network of conventional component circuits, as will be readily apparent to those skilled in the art.

One embodiment includes a computer program product which is a storage medium (media) having instructions stored thereon/in which can be used to program a computer to perform any of the features present herein. The storage medium can include, but is not limited to, any type of disk including floppy disks, optical discs, DVD, CD-ROMs, micro drive, and magneto-optical disks, ROMs, RAMs, EPROMs, EEPROMs, DRAMs, flash memory of media or device suitable for storing instructions and/or data stored on any one of the computer readable medium (media). The present invention can include software for controlling both the hardware of the general purpose/specialized computer or microprocessor, and for enabling the computer or microprocessor to interact with a human user or other mechanism utilizing the results of the present invention. Such software may include, but is not limited to, device drivers, operating systems, execution environments/containers, and user applications.

Embodiments of the present invention can include providing code for implementing processes of the present invention. The providing can include providing code to a user in any manner. For example, the providing can include transmitting digital signals containing the code to a user; providing the code on a physical media to a user; or any other method of making the code available.

Embodiments of the present invention can include a computer-implemented method for transmitting code which can be executed at a computer to perform any of the processes of embodiments of the present invention. The transmitting can include transfer through any portion of a network, such as the Internet; through wires, the atmosphere or space; or any other type of transmission. The transmitting can include initiating a transmission of code, or causing the code to pass into any region or country from another region or country. For example, transmitting includes causing the transfer of code through a portion of a network as a result of previously addressing and sending data including the code to a user. A transmission to a user can include any transmission received by the user in any region or country, regardless of the location from which the transmission is sent.

Embodiments of the present invention can include a signal-containing code which can be executed at a computer to perform any of the processes of embodiments of the present invention. The signal can be transmitted through a network, such as the Internet; through wires, the atmosphere or space; or any other type of transmission. The entire signal need not be in transit at the same time. The signal can extend in time over the period of its transfer. The signal is not to be considered as a snapshot of what is currently in transit.

Other features, aspects and objects of the invention can be obtained from a review of the figures and the claims. It is to be understood that other embodiments of the invention can be developed and fall within the spirit and scope of the invention and claims. The foregoing description of preferred embodiments of the present invention has been provided for the purposes of illustration and description. It is not intended to be exhaustive or to limit the invention to the precise forms disclosed. Many modifications and variations will be apparent to the practitioner skilled in the art. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalents.

The invention claimed is:

1. A method for synchronizing service metadata into a format for canonical representation of service metadata, comprising:

inspecting a plurality of applications, each application providing at least one service having service metadata associated therewith, wherein said each application generates the service metadata in a native format, and wherein the service metadata includes at least a set of service interfaces and a set of service dependencies between said service interfaces;

providing a plurality of connectors for said plurality of applications, wherein each type of said application is associated with a different connector depending on said type of the application;

obtaining the service metadata from each of said plurality of applications by the set of connectors, wherein each connector populates a node object with the service metadata in said native format;

providing said node object from the connector to a normalizer;

normalizing the service metadata of said each application by the normalizer, wherein the normalizer converts the node object from the native format into the format for canonical representation of service metadata and creates an artifact to contain the canonical representation, and wherein the format for the canonical representation of the service metadata is Service Component Architecture (SCA);

storing the artifact into a repository;

constructing a synchronized dependency graph based on the service dependencies between the service interfaces, wherein the service dependencies are normalized; and exposing, by said repository, an interface to retrieve the artifact associated with an application, wherein once the artifact is retrieved, a set of all dependent artifacts related to said artifact as indicated by the dependency graph are also retrieved, and wherein the interface exposed by the repository is Universal Description, Discovery, and Integration (UDDI).

2. The method of claim 1, wherein the service metadata includes: design-time metadata, deployment metadata, service interfaces, service dependencies, schemas, properties, relationships between services, service bindings, policies, and exposable implementation details.

3. The method of claim 1, wherein a service consumer accesses the backend system to obtain the normalized service metadata.

4. A system to synchronize service metadata into a format for canonical representation of service metadata, said system comprising:

a plurality of applications executing on one or more computing devices, each application providing at least one service having service metadata associated therewith, wherein said each application generates the service metadata in a native format, and wherein the service metadata includes at least a set of service interfaces and a set of service dependencies between said service interfaces;

at least one connector associated with each of said plurality of applications, said connector executed by the one or more computing devices, wherein each type of said application is associated with a different connector depending on said type of the application, wherein the connector permits a synchronization system to communicate bi-directionally with the each application, and wherein the connector obtains the service metadata from the application associated with the connector, and populates a node object with the service metadata in said native format;

one normalizer for each said application, wherein the normalizer transforms the node object containing the service metadata from the native format into a format for the canonical representation of service metadata and creates an artifact to contain the canonical representation, and wherein the format for the canonical representation of the service metadata is Service Component Architecture (SCA); and a repository that stores the artifact;

wherein a synchronized dependency graph is constructed based on the service dependencies between the service interfaces; and wherein the repository exposes an interface to retrieve the artifact associated with an application, wherein once the artifact is retrieved, a set of all dependent artifacts related to said artifact as indicated by the dependency graph are also retrieved, and wherein the interface exposed by the repository is Universal Description, Discovery, and Integration (UDDI).

5. The system of claim 4, wherein the normalizer makes normalized service metadata available as Java objects.

6. The system of claim 4, wherein the provider publishes the service metadata to a metadata repository.

7. The system of claim 6, wherein a chain of providers is processed sequentially.

8. The system of claim 4, wherein the format for canonical representation of service metadata is Service Component Architecture.

9. The system of claim 4, wherein a service consumer accesses the one or more backend systems to obtain the normalized service metadata.

10. A computer-readable storage medium containing instructions stored thereon, wherein the instructions, when executed by one or more processors, cause the one or more processors to perform the steps of:

inspecting a plurality of applications, each application providing at least one service having service metadata associated therewith, wherein said each application generates the service metadata in a native format, and wherein the service metadata includes at least a set of service interfaces and a set of service dependencies between said service interfaces;

providing a plurality of connectors for said plurality of applications, wherein each type of said application is associated with a different connector depending on said type of the application;

obtaining the service metadata from each of said plurality of applications by the set of connectors, wherein each connector populates a node object with the service metadata in said native format;

providing said node object from the connector to a normalizer;

normalizing the service metadata of said each application by the normalizer, wherein the normalizer converts the node object from the native format into the format for canonical representation of service metadata and creates an artifact to contain the canonical representation, and wherein the format for the canonical representation of the service metadata is Service Component Architecture (SCA);

storing the artifact into a repository;

constructing a synchronized dependency graph based on the service dependencies between the service interfaces, wherein the service dependencies are normalized; and exposing, by said repository, an interface to retrieve the artifact associated with an application, wherein once the artifact is retrieved, a set of all dependent artifacts related to said artifact as indicated by the dependency graph are also retrieved, and wherein the interface exposed by the repository is Universal Description, Discovery, and Integration (UDDI).

11. The computer-readable storage medium of claim 10, wherein the service metadata includes: design-time metadata, deployment metadata, service interfaces, service dependencies, schemas, properties, relationships between services, service bindings, policies, and exposable implementation details.

12. The computer-readable storage medium of claim 10, wherein a service consumer accesses the one or more backend systems to obtain the normalized service metadata.

* * * * *